United States Patent Office 3,167,360
Patented Jan. 26, 1965

3,167,360
BRAKE REGULATOR AND SYSTEM
INCORPORATING SAME
Heinrich Oberthür, Offenbach (Main), Germany, assignor
to Alfred Teves KG., Frankfurt am Main, Germany
Filed Apr. 17, 1963, Ser. No. 273,751
Claims priority, application Germany Apr. 19, 1962
8 Claims. (Cl. 303—22)

My present invention relates to a brake regulator and to a brake system incorporating such regulator. This application is a continuation-in-part of my copending application Ser. No. 217,609 filed August 17, 1962 and entitled Brake Regulator.

In the aforementioned copending application, I disclose a brake regulator especially designed to reduce the force applied to the brake drum or disk of a motor-vehicle brake system to obviate locking of the brakes and prevent skidding and slippage. The principle under which such a regulator operates is that, when the brake force has reached an optimum level for the vehicle and its load condition rate of increase of the brake pressure is reduced with continued application of force to the brake pedal by the operator.

In the copending application, a system is described for eliminating the disadvantages of prior-art devices which required the use of a plurality of check valves, pistons and control springs all of which were relatively sensitive so that complete control of the braking force and a well-defined switchover point between high and low braking force was not possible. In the improved regulator the piston was provided with a passage communicating between first and second chambers connected, respectively, to the master cylinder and the brake or wheel cylinders. A valve means was provided in this passage for selectively opening and closing it and was operated upon engagement with an abutment means under the force of a yieldable restoring means. The latter could be designed to apply variable restoring forces responsive to load conditions etc. This system while having a great deal of general applicability, was not readily adaptable to systems having markedly larger brake-cylinder capacities than the volume of the previously mentioned second chamber. In fact, such a change in volume frequently occurred with brake-lining wear and thus limited the effectiveness of the regulator whose stroke was approximately a function of the capacity of this second chamber.

It is an object of the present invention to provide an improved brake regulator of the aforedescribed type as an extension of the principles advanced in my above-identified earlier application.

A more specific object of this invention is to provide a braking-force regulator and a brake system incorporating same whose effectivenesses will not be limited by the capacity of the pressure chamber.

Still another object of the invention is a provide a brake regulator applicable for use with brake cylinders of substantially any capacity and interposable in pre-existing systems of essentially any hydraulic type.

Yet another object of the invention is to provide a brake regulator of the aforementioned character which can be compact and of relatively simple construction regardless of the capacity of the system with which it is used.

These objects are attained, in accordance with the present invention by providing a braking-force regulator of the type described in my copending application with means for draining fluid from the second or pressure chamber upon release of the brake. In general, therefore, the brake regulator, which is connected between the master cylinder and the brake or wheel cylinders, will comprise a differential piston reciprocable against the force of a restoring means. The nature of this restoring means has been fully set forth in the earlier application and need not be described in detail herein. It suffices to note that the restoring means can provide a yieldable force which is manually adjustable or regulated automatically in accordance with the load to urge the differential piston into one extreme position.

As previously noted, the differential piston subdivides the regulator into a first chamber to which is applied the force of the master cylinder and a second chamber connected with the wheel or brake cylinders. This piston is provided with a passage communicating between these fluid chambers and provided with a valve means cooperating with a stationary abutment means for unblocking the passage in the extreme position of the piston into which it is urged by the force of the restoring means. The effective surface area of the differential piston exposed to fluid pressure in the second chamber is larger than the effective surface area exposed to fluid pressure within the first chamber, the latter surface being disposed in aiding relationship with the restoring means. It is clear, therefore, that application of the brakes by the vehicle operator will result in a displacement of the piston of the master cylinder to force fluid into the first chamber whence it flows through the unblocked surfaces into the second chamber and is communicated to the wheel cylinders. This action continues until the brake shoes of the wheel cylinders resist further displacement whereupon a pressure build-up in the second chamber will eventually result in a larger application of force to the differential piston than is applied thereto by the restoring means and the first or smaller surface. Continued application of force to the brake pedal will then displace the differential piston away from its extreme position to disengage the valve means from the abutment means. The braking force applied to the wheel cylinders will, consequently, be reduced to the desired level.

Upon release of the brake pedal, however, the pressure within the first chamber is substantially reduced so that the differential piston shifts further away from its extreme position and, in accordance with the present invention, unblocks an aperture through which excess fluid can be drained from the second chamber.

According to a more particular feature of the present invention, the differential piston forms with the aperture, which can be provided in the regulator body, a valve means for controlling the draining of fluid from the second chamber. To this end the differential piston can be provided with an annular edge slidably cooperating with the wall of the regulator bore to form the valve means at the aperture. Advantageously, the wall of the bore can be provided with sealing means adapted to enclose the mouth of the aperture in a closed position of the piston. Such sealing means can include resilient seal rings which bear against the piston and are inwardly convex for camming engagement thereby. For this purpose, the differential piston may be provided with an inclined camming surface forcing the seal ring into its seat upon displacement of the piston into its closed position.

The above and other objects, features and advantages of the present invention will become more readily apparent from the following description, reference being made to the appended drawing in which.

Figure 1:
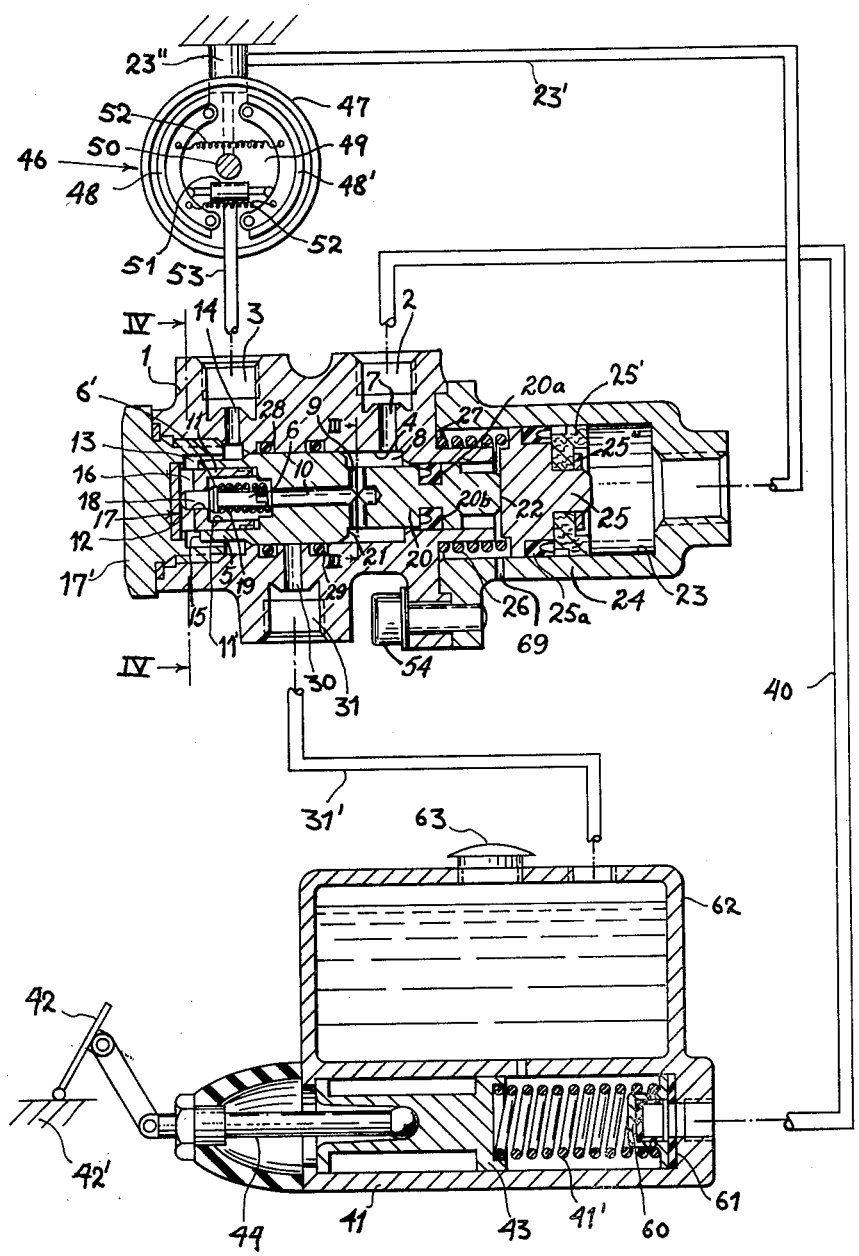
FIG. 1 is an axial cross-sectional view through a brake regulator according to the present invention diagrammatically showing the remainder of the brake system.

In the drawing I show a brake regulator body 1 which is provided with an inlet 2 for the brake fluid. This inlet is connected via a first conduit means 40 with a master cylinder 41 whose construction is known per se and which is only shown diagrammatically. A brake pedal 42 is pivotally mounted on the motor-vehicle body 42′ and is swivellably connected with the piston rod 44 of a master piston 43 which is displaceable within the cylinder 41. The usual foot-type check valve 60 can, if desired, be seated against a resilient ring 61 of the master cylinder 41 which is provided with a reservoir or source 62 of the pressure fluid. Additional liquid can be added to the reservoir by a vented filler cap 63.

Fluid inlet 2 communicates with a first chamber 8 of the regulator bore 4 via a radial passage 7. The bore 4 receives a differential piston 20 whose head 5 is closely adjacent and slidably engages the wall of bore 4.

Figure 4:
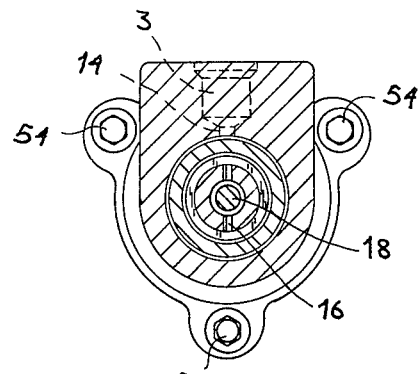
FIG. 4 is a view taken generally along the line IV—IV of FIG. 1.
Figure 3:
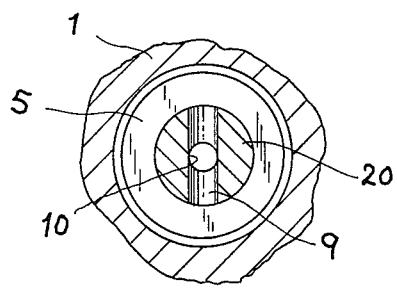
FIG. 3 is a cross-sectional view taken generally along the line III—III of FIG. 1.

The regulator piston 20 is provided with a radial bore 9 (FIGS. 1 and 3) communicating with the first chamber 8 and opening into a center bore 10 axially extending within the head 5 of the piston and forming a fluid passage communicating between the first and second chambers. At the terminus of bore 10 there is provided a cap 11 which forms an axial compartment 11′ and a valve seat 12 for an axially displaceable valve member 6 adapted selectively to block and unblock the passages 9, 10 and 11. The valve member 6 is formed with an annular shoulder 6′ engageable with the valve seat 12. Member 6 is also provided with a stud 18 extending through the cap with peripheral clearance and abuttingly engageable with the juxtaposed wall 17 of a block 17′ forming part of the regulator body 1. The abutment means 17 constitutes with the differential piston 20 a second chamber 13 into which fluid can pass around stud 18 via groove 16 (FIGS. 1 and 4). From the chamber 13, fluid can flow via a radial bore 14 and an outlet 3 to the brake cylinder 51 of, say, the rear-wheel brakes 46, only one of which is shown. It should be noted that a plurality of individual brake cylinders can be connected at the outlet 3 in the usual manner.

The brake 46, illustrated diagrammatically in FIG. 1, comprises a brake drum 47 against which a pair of brake shoes 48, 48′, pivotally joined to a support 49 on axle 50, are secured. Springs 52 tend to draw the shoes 48, 48′ out of engagement with the brake drum 47. The second conduit means 53 connects brake cylinder 51 with the regulator body 1 at its outlet 3. Piston 20 is also provided with a circumferential groove 20a in which is seated a flange seal 20b for preventing escape of hydraulic fluid. This seal forms, with its seat, the smaller head of the differential piston. Rearwardly of the seal 20b the piston is provided with a stud 22 extending outwardly of body 1 and having an end surface against which the force of a suitable restoring means is applied.

The restoring means shown in FIG. 1 can have the configuration of either of the restoring means shown in the aforedescribed copending application and advantageously is of the automatically adjustable type. The restoring means thus can comprise a tubular casing 24 which is removably mounted on the rear end of body 1 by bolts 54 and includes a floating piston 25 to which a packing 25′ is secured by a spring clip 25″. A flanged annular seal 25a is received in a peripheral recess on the floating piston 25, while a spring 27 bears thereon against the force of a pneumatic cushion within chamber 23. The restoring force can be raised or lowered by increasing or decreasing the pressure within the chamber 23. To this end the latter chamber can communicate, via another transmission line 23′, with a pneumatic cylinder 23″ constituting part of the vehicle suspension. An increase in the load applied to the vehicle chassis will result in the compression of fluid within the pneumatic cylinder 23″ and consequently increase the effective loading of the air cushion within chamber 23.

Figure 2:
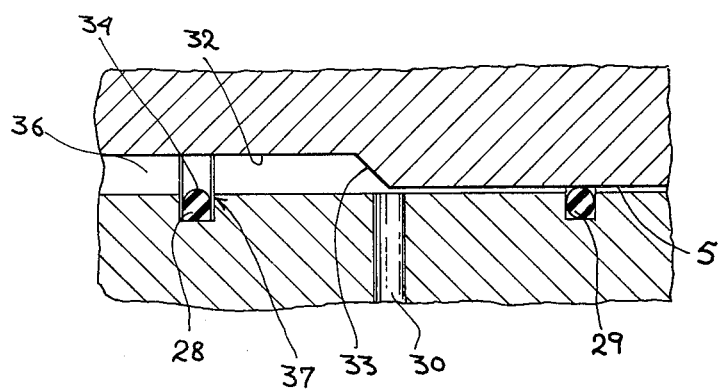
FIG. 2 is a detailed view drawn to an enlarged scale of a portion of the regulator.

The regulator body 1 is also provided with an outlet 31, connected via a tube 31′ with the reservoir 62 and communicating with an aperture 30 opening at the wall of regulator bore 4. The length of the piston head 5 is so selected that in its extreme position the piston 20 blocks the aperture 30. When, however, the piston is displaced to the right (FIG. 1) a control edge 33′ of the larger effective surface of the piston clears the aperture (FIG. 2) to unblock it and permit the flow of the fluid from chamber 13 to the reservoir 62. It has been found that a conventional O-ring, such as that shown at 29 for the rearward annular seal of the aperture 30, cannot be used as the forward seal 28 since a round cross-section will result in the escape of the ring from its recess and its possible entry between the beveled shoulder 33 of piston head 5 and the wall of bore 4. Groove 35 is, therefore, provided with flat lateral walls against which the parallel flat lateral faces of the ring 28 abut. This ring is, however, provided with an inward convexity for camming engagement by the shoulder 33 to seat the ring 28 in the foot of the groove 35. It is important to note, at this point, that aperture 30 should open only along the surfaces of the differential piston having the larger effective area and should not communicate with chamber 8 to avoid draining the master cylinder without braking action. The flat lateral surfaces of ring 28 prevent its displacement from the groove 35 into a position in which it will become wedged between the wall of bore 4 and the periphery of head 5.

Prior to initiation of the braking action, differential piston 20 is in its position shown in FIG. 1, biased to the left by the pressure of the air cushion within restoring cylinder 23. The valve 6 is thus held open against the abutment 17 since its spring 19 and spring 27 are, in combination, weaker than the cushion force. When it is desired to brake the vehicle, the operator depresses brake pedal 42 to force fluid from reservoir 62, which has filled the master cylinder 41, into the first chamber 8 by inlet 2. Since valve 6 is open, the fluid passes via bores 9 and 10 outwardly past the valve seat 12 and thence through grooves 16 in the front face of cap 11 into the second chamber 13. The brake cylinders 51 are thus charged with fluid and the brake shoes 48, 48′ expanded against the brake drums 47 on the rear wheels. As long as valve 6 is open, the force applied to the brake is equal to the force applied to the brake pedal (although power arrangements can be provided to multiply the braking force if desired). The fluid pressure within the chambers 8 and 13 thus increases progressively.

Since the annular surface 21 within chamber 8 has an area $A_1$ which is less than that of the second surface 15 of the head 5, the piston 20 tends to move to the right against the force of the air cushion. The areas $A_1$ and $A_2$ are ascribed for convenience to surfaces 21 and 15, respectively, although these indicia should, in fact, refer to the total areas of all surfaces effective to the left and to the right (i.e. in aiding and opposing relationship with the cushion force). By virtue of the differential action, piston 20 progressively compresses the pneumatic cushion within chamber 23 and draws the valve seat 12 against the valve member 6 to close the passage connecting the first and second chambers. While the valve is open, it may be assumed that the pressure within the chambers 8 and 13 is equal and increases uniformly so that $(P \times A_2) - (P \times A_1)$ defines the hydraulic force F effectively to displace the piston to the right. This displacement can only continue until the force F equals the opposing force Fs of the cushion.

Additional force applied to the brake pedal 42 results in closure of the valve. Once the valve is closed, it can be noted that any increase in force applied to the piston via the first chamber 8 will result in a fractional transmittal of force (as determined by the ratio $A_1/A_2$) to the second chamber 13 and a consequent reduction in force transmittal to the brake cylinders 51.

Upon release of the pedal 52, the spring 41' of the master cylinder 41 returns the master piston 43 to its original position in which additional fluid can be drawn into the master cylinder from the reservoir. When the pressure in chamber 8 is reduced, the piston 20 is moved to the right under the force of the fluid within chamber 13 until aperture 30 is unblocked whence fluid drains from the wheel cylinders 51 into the reservoir. This operation proceeds until the force of the pneumatic cushion again dominates and closes the aperture by displacing the piston 20 again to the left. A bleed port 69 is provided to prevent air locking of restoring piston 25. The beveled surface 33 converges axially in the direction of the second chamber so that it can cam the seal 28 into its groove 35. The convex surface of this ring thus bears resiliently against the piston head 5 with which it forms a valve means. It is clear that the regulator is operable with brake cylinders of any capacity and that the total fluid displacement of the regulator can greatly exceed, if necessary, the fluid capacity of chamber 13. The fraction of fluid remaining in chamber 13 can, if desired, be returned to the master cylinder under the pressure of the pneumatic cushion if the check valve 60, 61 is dispensed with.

The invention described and illustrated is believed to admit of many modifications within the ability of persons skilled in the art; all such modifications are considered as falling within the spirit and scope of the invention defined in the appended claims.

I claim:

1. A liquid-actuated closed brake system comprising:
a source of pressure liquid;
a brake cylinder energizable by said fluid;
a master cylinder connected with said source and actuable to supply said liquid to said brake cylinder;
a braking force regulator interposed between said cylinders for reducing the pressure applied to said brake cylinder upon the attainment of an optimum braking force, said regulator comprising a body having a longitudinally extending bore, a differential piston reciprocable within said bore and subdividing the latter into a first chamber and a second chamber, said piston having a wall slidably engaging said body along said bore and being formed with a passage interconnecting said chambers, valve means in said passage for selectively opening and blocking same, abutment means engageable with said valve means for maintaining said passage open in one extreme position of said piston, and restoring means yieldably urging said piston into said extreme position;
first conduit means connecting said master cylinder with said first chamber;
second conduit means connecting said second chamber with said brake cylinder, said piston having a first effective surface exposed to liquid pressure in said first chamber for applying a force to said piston in aiding relationship with the force of said restoring means and a second effective surface having an area greater than that of said first surface exposed to liquid pressure in said second chamber, said regulator provided with an aperture opening into said bore along the path of said piston and adapted to be selectively blocked and unblocked by said wall of said piston with displacement of said piston for conducting liquid away from said second chamber upon shifting of said piston away from said extreme position to another extreme position under the force of liquid within said second chamber; and
third conduit means communicating with said second chamber through said aperture and connecting the aperture with said source for returning thereto liquid conducted away from said second chamber.

2. A brake system comprising:
a source of pressure fluid;
a brake cylinder energizable by said fluid;
a master cylinder connected with said source and actuable to supply said fluid to said brake cylinder;
a braking-force regulator interposed between said cylinders for reducing the pressure applied to said brake cylinder upon the attainment of an optimum braking force, said regulator comprising a body having a longitudinally extending bore, a differential piston reciprocable within said bore and subdividing the latter into a first chamber and a second chamber, said piston being formed with a passage interconnecting said chambers, valve means in said passage for selectively opening and blocking same, abutment means engageable with said valve means in one extreme position of said piston means for retaining the valve means in an open condition and restoring means yieldably urging said piston into said extreme position;
first conduit means connecting said master cylinder with said first chamber;
second conduit means connecting said second chamber with said brake cylinder, said piston having a first effective surface exposed to fluid pressure in said first chamber for applying a force to said piston in aiding relationship with the force of said restoring means and a second effective surface having an area greater than that of said first surface exposed to fluid pressure in said second chamber, said body being provided with an aperture cooperating with said piston and selectively blocked and unblocked thereby for conducting fluid away from said second chamber upon shifting of said piston under the force of fluid within said second chamber; and third conduit means connecting said aperture with said source for returning thereto fluid conducted away from said second chamber, said body being provided with at least one inner circumferential groove in the wall of said bore and an annular sealing member of resiliently deformable material seated in said bore and engageable with said piston for closing communication between said chambers and said aperture in a blocking position of said piston.

3. A brake system as defined in claim 2 wherein said groove is disposed forwardly of said aperture in the direction of displacement of said piston toward said extreme position and is provided with flat wall portions lying generally in radial planes, said member having flat flanks parallel to said walls.

4. A brake system as defined in claim 3 wherein said member is provided with an inwardly convex portion extending into said bore, said piston having a beveled annular shoulder cammingly engageable with said member for urging it into said groove.

5. A brake system as defined in claim 2 wherein said aperture opens into said bore transversely thereof at said second surface of said piston in an unblocking position thereof.

6. A brake system as defined in claim 5 wherein said piston is provided with an annular shoulder constituting at least part of said second surface and forming with said aperture a valve for controlling drainage of fluid from said second chamber.

7. A brake system as defined in claim 6 wherein said body is provided with a pair of axially spaced sealing rings frictionally engageable with said piston on opposite sides of said aperture.

8. A liquid-actuated brake system comprising: a source of pressure liquid; a brake cylinder energizable by said liquid; a master cylinder connected with said source and actuable to supply said liquid to said brake cylinder; a braking-force regulator interposed between said master cylinder and said brake cylinder, said regulator comprising a body having a longitudinally extending stepped bore, a complementarily stepped differential piston reciprocable within said bore and subdividing the latter into a first and a second chamber; said piston having a first and a second effective surface respectively associated with said first and second chambers and extending therein transversely of the direction of reciprocation of said piston; first conduit means connecting said master cylinder with said first chamber, said liquid being adapted to enter said first chamber under pressure through said first conduit means for applying a force to said first surface of said piston; second conduit means connecting said brake cylinder to said second chamber, said second surface of said piston having an area greater than that of said first surface and being exposed to the pressure of said liquid in said second chamber, said piston being provided with a passage extending longitudinally therewithin and connecting said first chamber with said second chamber; a valve, having a valve spring and a valve stem, in said passage for regulating the flow of liquid therethrough; abutment means in said housing, said valve cooperating with said abutment means via said valve stem under the action of said valve spring and the pressure of said liquid in said second chamber for selectively blocking and unblocking the connection between said master cylinder and said brake cylinder through said passage, said valve being held in an open condition in an extreme position of said piston; resilient restoring means in said housing for yieldably urging said piston into said extreme position, said housing being provided with an aperture opening into said bore through the wall thereof; third conduit means connecting said aperture with said liquid source; and means, including said second surface of said piston, for selectively blocking said aperture against the passage of liquid therethrough.

References Cited in the file of this patent

UNITED STATES PATENTS 3,006,694    Valentine et al. _____ Oct. 31, 1961